April 12, 1932.　　　R. F. KOHR　　　1,853,905
BRAKE
Filed Jan. 24, 1929　　　3 Sheets-Sheet 1
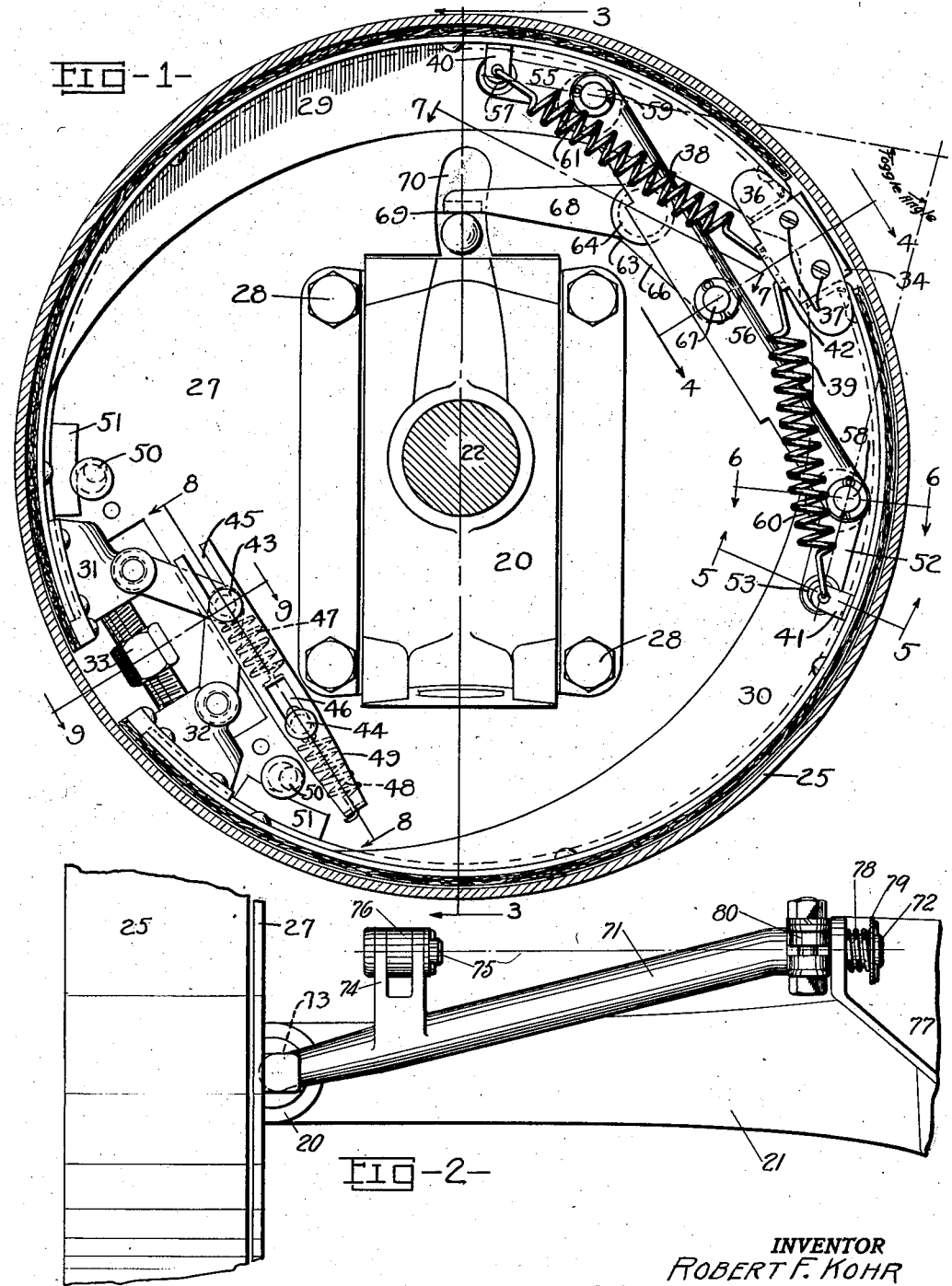

April 12, 1932.  R. F. KOHR  1,853,905
BRAKE
Filed Jan. 24, 1929   3 Sheets-Sheet 2
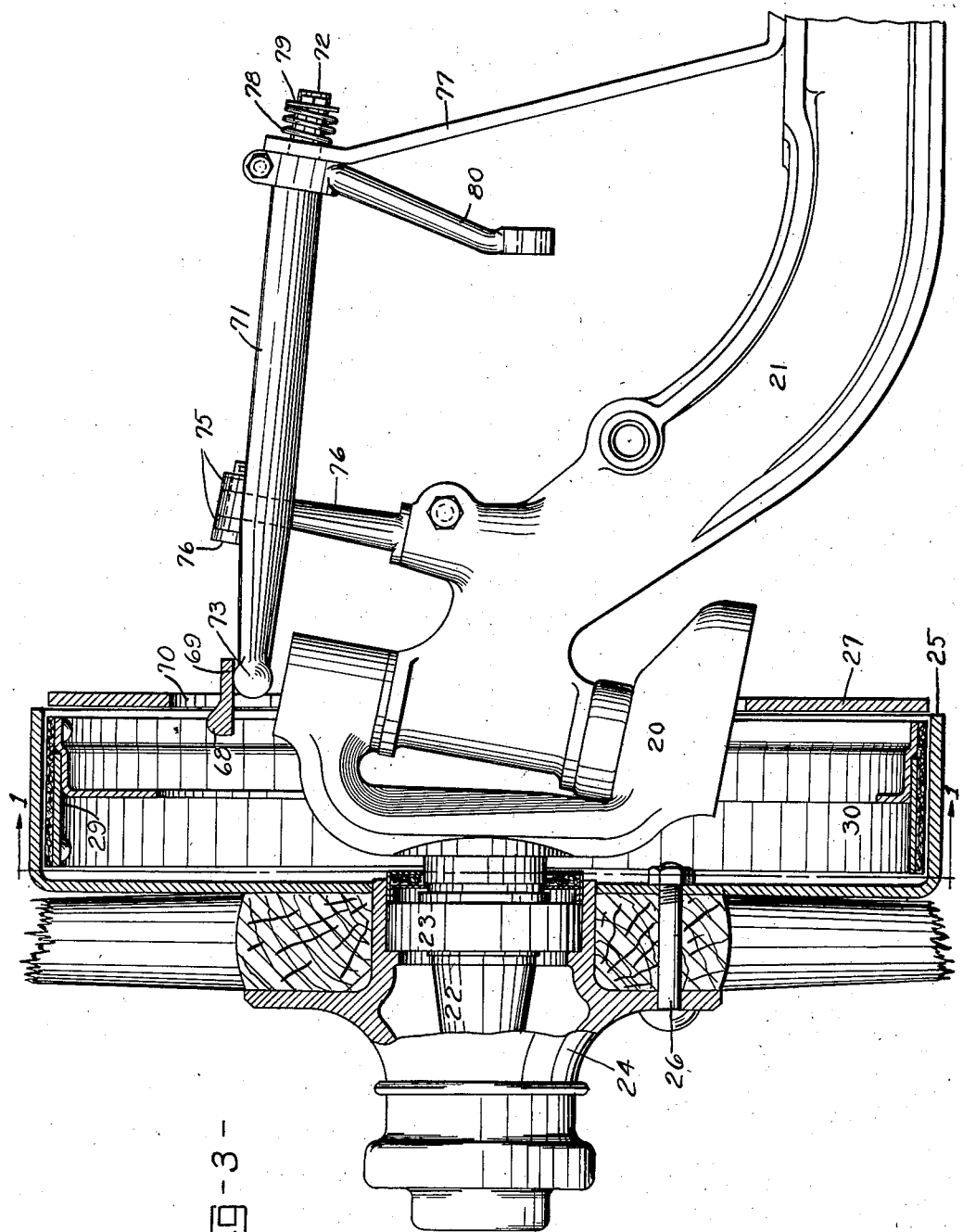
INVENTOR
ROBERT F. KOHR.
BY
ATTORNEY April 12, 1932.  R. F. KOHR  1,853,905
BRAKE
Filed Jan. 24, 1929    3 Sheets-Sheet 3
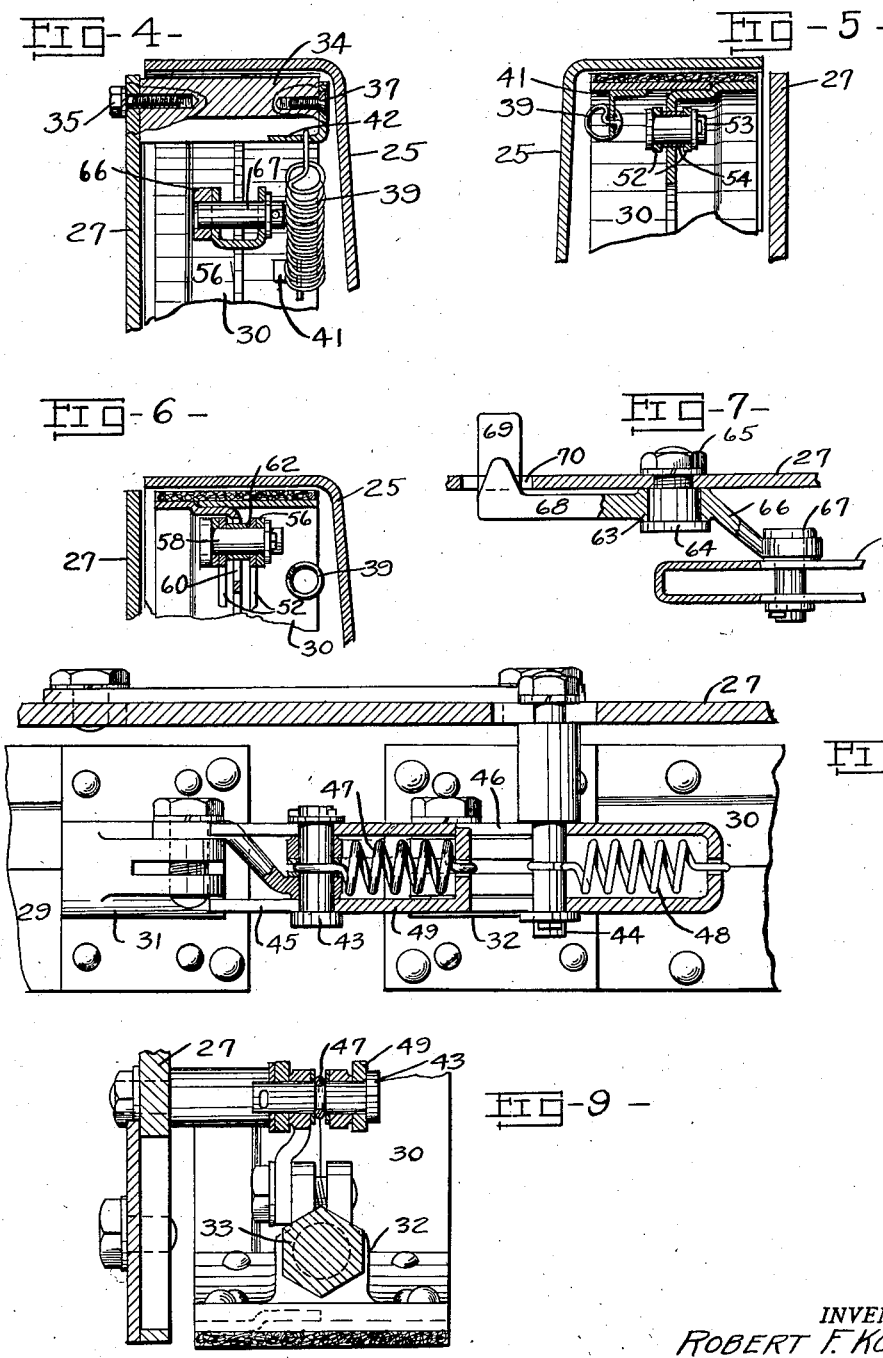
INVENTOR
ROBERT F. KOHR
BY
ATTORNEY Patented Apr. 12, 1932

1,853,905

UNITED STATES PATENT OFFICE

ROBERT F. KOHR, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed January 24, 1929. Serial No. 334,733.

This invention relates to vehicle brakes and particularly to means for expanding the brake element into engagement with the brake drum, the principal object being to provide a brake mechanism in which the brake element is bodily shifted into partial engagement with the brake drum before the same is completely engaged therewith.

Another object is to provide a brake mechanism with a single operating means which first bodily moves the brake element into partial engagement with the brake drum and then expands the same into complete engagement therewith.

A further object is to provide a brake mechanism with a single operating means which exerts a force in one direction to first partially engage the brake element in non-expanded position with the brake drum and then exerts a force in a different direction to completely engage the brake element with the brake drum.

A still further object is to provide a brake mechanism with angularly positioned springs for holding the brake element in normal non-engaging position, the springs being adapted to first allow the brake element to be bodily shifted into partial engagement with the brake drum and then to allow the brake element to be expanded into complete engagement with the brake drum.

These being among the objects of the present invention, the same consists of certain features of construction and combinations of parts to be hereinafter described with reference to the accompanying drawings and then claimed, having the above and other objects in view.

In the accompanying drawings which illustrate a suitable embodiment of the present invention, Figure 1 is a section taken on the line 1—1 of Figure 3 showing the brake element and operating mechanism in elevation.

Figure 2 is a plan view showing the operating means for the brake mechanism.

Figure 3 is a transverse section taken approximately on the line 3—3 of Figure 1, showing a portion of the axle, the steering knuckle and the brake operating means in side elevation.

Figure 4 is a transverse section taken on the line 4—4 of Figure 1 showing the brake element stop member.

Figure 5 is a transverse section taken on the line 5—5 of Figure 1 showing the method of pivoting one of the toggle links to the brake element.

Figure 6 is a section taken on the line 6—6 of Figure 1 showing the method of attaching one of the toggle links to the operating bar.

Figure 7 is a section taken approximately on the line 7—7 showing the bell crank which actuates the operating bar.

Figure 8 is an enlarged section taken approximately on the line 8—8 of Figure 1 showing the brake element centering device.

Figure 9 is an enlarged transverse section taken approximately on the line 9—9 of Figure 1.

In my co-pending application, Serial No. 276,636, filed May 10th, 1928, a brake mechanism has been described and claimed in which the brake element is first bodily shifted into partial engagement with the brake drum and then expanded into complete engagement therewith. The present invention which is about to be described in detail relates to this type of brake mechanism and particularly to improvements in the expanding means and the means for maintaining the brake element in normal non-engaging position.

Referring to the accompanying drawings in which like numerals refer to like parts throughout the several views, the brake shown is the one incorporated with the left front wheel of a motor vehicle. A steering knuckle 20 is pivotally mounted on the vehicle front axle 21 and is provided with an outwardly extending stub axle 22 which carries a bearing 23. The vehicle wheel 24 is mounted on the bearings 23 and has a brake drum 25 concentrically secured thereto by suitable bolts 26. The dust cover or backing plate 27 is mounted on the steering knuckle 20 by cap screws 28 adjacent to the open end of the brake drum 25 to exclude as much dirt and foreign particles as possible from the brake mechanism.

The brake mechanism which is supported by the backing plate 27 comprises two brake shoes 29 and 30 and the means for engaging them with the brake drum. The shoes 29 and 30 may be identical in construction, each having brackets 31 and 32 respectively at adjacent ends, each of which receives one end of a double ended reversely threaded screw 33 which unites the two shoes to form the complete brake element. The brake element comprising the two shoes 29 and 30 is arranged concentrically within the brake drum 25 and the adjacent free ends of the same abut against opposite sides of a stop member 34 which is secured to the backing plate by screws 35, as shown in Figure 4. A plate 36 is secured to the stop member 34 by screws 37 to guide the brake shoes 29 and 30 and to prevent transverse movement or twisting of the same. Two tension springs 38 and 39 are provided to normally hold the brake shoes 29 and 30 out of contact with the brake drum 25 and to normally hold the free ends of the shoes in contact with opposite sides of the stop member 34. One end of the spring 38 is hooked through an L-shaped bracket 40 welded to the brake shoe 29, and one end of the spring 39 is hooked through a similar L-shaped bracket 41 welded to the brake shoe 30. The other ends of the springs 38 and 39 are hooked through an extension 42 of the guide plate 36, which extension is bent inwardly at right angles to the main portion of the same substantially as shown in Figure 4.

The springs 38 and 39 extend away from the free ends of the shoes 29 and 30 for a purpose which will be described later.

The brake element is of the full floating internal expanding type, that is, the type wherein the brake element rotates a substantial amount with the brake drum to apply greater braking effort. It is apparent that some means must be provided for returning the brake element to normal inoperative position. This is accomplished by means of the self centering device shown in Figures 1, 8 and 9. This device, however, is the subject matter of a patent application by Andrew P. Wisner, Serial No. 334,707, filed on even date herewith, and therefore will not be described in detail.

Generally described, this self centering device comprises a pin 43 adapted to move with the brake shoes 29 and 30, a stationary pin 44 secured to the backing plate 27, a plate 49 having slots 45 and 46 therein respectively receiving the pins 43 and 44, and two tension springs 47 and 48. One end of the spring 47 is attached to the plate 49 and the other end is attached to the movable pin 43. Similarly one end of the spring 48 is attached to the plate 49 and the other end is attached to the pin 44. Now, with the device in neutral position, that is, with the brakes in non-operative position, the pin 43 engages the end of the slot 45 and the pin 44 engages an end of the slot 46 as shown in Figures 1 and 8. If the brake is applied when the wheel in which it is incorporated is rotating in a clockwise direction, the pin 43 moves in the seat 45 which is held against movement in that direction by the pin 44 and the spring 47 is put in tension. The spring 47, as soon as the braking pressure is released, pulls the brake element back to normal position. If the brake is applied when the wheel is moving in a counter clockwise direction, the pin 43 exerts a pressure against the plate 49 and causes the same to move relative to the pin 44, thereby putting the spring 49 in tension. The spring 49, likewise when the braking pressure is released, draws the brake element back to normal inoperative position. Concentricity of the brake element relative to the brake drum 25 is maintained by a pair of spaced eccentrically mounted spools 50 which engage plates 51 secured to the shoes 29 and 30.

The operating mechanism for the brake element is very simple and can be economically produced from sheet metal stampings as shown in Figures 1, 4, 5 and 6. A pair of links 52 are pivoted by means of a pin 53 to the web of the brake shoe 30 and are positioned on each side of the same, a spacer 54 carried by the pin 53, as shown in Figure 5, being used to hold the links 52 in spaced relationship in order to prevent the same from rubbing against the sides of the brake shoe web and thereby increasing friction.

Similarly a pair of links 55 held in spaced relationship by a spacer (not shown) are positioned on opposite sides of web of the brake shoe 29 and are pivoted thereto by a pivot pin 57. The free ends of the pairs of links 52 and 55 are interconnected by a U-shaped operating bar 56 and are pivoted thereto by pivot pins 58 and 59 respectively. Enlarged openings 60 and 61 are formed in the webs of the shoes 30 and 29 respectively for the pins 58 and 59 to extend therethrough and to move therein. Spacers 62 are also carried by the pins 58 and 59 as shown in Figure 6 to prevent the sides of the bar 56 from moving inwardly toward each other and also to strengthen the bar 56.

The links 52 and 55 have their respective ends so positioned on the brake shoes 29 and 30 and the bar 56 connecting the opposite ends of links 52 and 55 is of such a length that the longitudinal axes of the links when extended intersect outside of the brake drum. That is, the axes intersect outside of the brake drum at least when the brake shoes are in inoperative position, as shown in Figure 1. By so arranging the links the effective toggle angle is considerably more acute than in prior constructions where the links are directly connected, thus permitting a free movement of the brake shoes bodily of the drum for initial engagement therewith and without any appreciable tendency of the shoes to expand during the initial movement thereof.

The bar 56 is actuated by means of a bell crank 63 pivoted on a pin 64 which is attached to the backing plate 27 by a nut 65. The arm 66 of the bell crank is pivoted to the operating bar 56 intermediate its ends by a pin 67 extending therethrough as shown in Figure 7. The other arm 68 of the bell crank 63 which is oppositely disposed to the arm 66 terminates in a cam finger 69 which is disposed at right angles thereto and extends through an enlarged slot 70 in the backing plate 27.

The operating means for the bell crank 63 is the subject matter of another patent application filed by Andrew P. Wisner Serial No. 334,706 filed on even date herewith. This means is shown in Figures 2 and 3 and will only be described to show the operation of the same.

This operating means comprises a bar 71 having a shaft portion 72 at one end extending at an angle to the main body of the bar 71. The other end of the bar 71 terminates in a spherical shaped member 73 which engages the cam finger 69 substantially on the pivotal axis of the steering knuckle 20. The bar 71 is formed with an offset portion 74 intermediate its ends which is slotted and pivoted by means of a pin 75 to a support 76 carried by the axle 21. The axis of the pin 75 coincides, as shown in Figure 2, with the axis of the shaft extension 72, the shaft extension 72 being supported by a bearing plate 77 secured to the axle 21. The shaft 72 is provided with a coil spring 78 abutting against the bearing plate 77, and a washer 79 to compress the spring 78 which prevents excessive longitudinal movement of the member 71. A lever 80 is secured to the member 71 and is connected to some source of braking pressure (not shown) such as a brake foot pedal or hand lever. Because of the fact that the centerlines of the pin 75 and shaft 72 lie on the same axis, movement of the lever 80 causes the end 73 of the member to swing in an arc against the cam finger 69 to pivot the bell crank 63.

Pivotal movement of the bell crank 63 exerts a force against the operating bar 56 which force is divided and equally distributed to the links 52 and 55. The forces acting on the links 52 and 55 are divided in two components at right angles to each other. These component forces act against the pins 53 and 57 which respectively pivot the link 52 and 55 to the brake shoes in directions both perpendicular to the operating bar 56 and parallel thereto. The springs 38 and 39 being disposed at angles less than the angles of the links 52 and 55 require a greater force in a direction parallel to the bar 56 to stretch the same than a force in a direction perpendicular to the bar 56. Consequently, when forces are exerted against the pivot pins 53 and 57, they first act perpendicular to the bar 56 and bodily shift the brake element without moving the ends of the same away from the stop member 34, until that portion of the brake element diametrically opposite the free ends thereof engage the brake drum 25. At the instant of engagement the brake element rotates with the drum 25 until one of the brake shoes 29 or 30 is completely engaged therewith.

Further exertion of forces against the pivot pins 53 and 57 causes the free end of the other shoe to move away from the stop member 34 and engage the brake drum 25 to effect a complete braking action. In this way many of the objectionable features of the conventional servo brake are eliminated.

While I have shown and described one embodiment of my invention, it is to be understood that formal changes may be made therein without departing from the spirit and substance of the broad invention, the scope of which is commensurate with the appended claims.

What I claim is:

1. In a vehicle brake, a rotatable drum, braking means engageable therewith, a backing plate adjacent to said drum, and operating means for bodily shifting said braking means into partial engagement with said drum and then expanding the same into complete engagement therewith comprising, a pair of links pivotally connected to said braking means adjacent to the free ends thereof, the extended longitudinal axes of said links intersecting each other outside of the drum, a bar pivotally connecting the free ends of said links, and a bell crank lever pivotally supported intermediate its ends on said backing plate pivotally connected at one end thereof to said bar for operating said braking means.

2. In a vehicle brake, a rotatable drum, braking means engageable therewith, a backing plate adjacent to said drum, and operating means for bodily shifting said braking means into partial engagement with said drum and then expanding the same into complete engagement therewith comprising, means pivotally connected to said braking means adjacent to the free ends thereof, the extended longitudinal axes of said means intersecting each other outside the drum when said braking means is in inoperative position, a bar pivotally connected with said means, and means connected with said bar for operating said braking means.

3. In a vehicle brake, a rotatable drum, breaking means engageable therewith, a backing plate adjacent to said drum, and operating means for bodily shifting said braking means into partial engagement with said drum and then expanding the same into complete engagement therewith comprising, a pair of links pivotally connected to said braking means with their longitudinal axes intersecting each other outside of said drum when said braking means is in inoperative position, means pivotally connecting the free ends of said links, and means connected with said first means for operating said braking means.

4. In a vehicle brake, a rotatable drum, braking means engageable therewith, a backing plate adjacent to said drum, and operating means for bodily shifting said braking means into partial engagement with said drum and then expanding the same into complete engagement therewith comprising, a pair of links pivotally connected to said braking means adjacent to the free ends thereof, a bar pivotally connecting the free ends of said links, a bell crank lever pivotally supported intermediate its ends on said backing plate pivotally connected at one end thereof to said bar for operating said braking means, and a pair of springs each connected at one end thereof to said braking means and at the opposite ends to a fixed support, the inclusive angle formed by the longitudinal axes of said springs being greater than the inclusive angle formed by the longitudinal axes of said links to thereby permit bodily movement of said braking means prior to the expanding of the same.

5. In a vehicle brake, a rotatable drum, braking means engageable therewith, an operating means for bodily shifting said braking means into partial engagement with said drum and then expanding the same into complete engagement therewith comprising, a pair of links pivotally connected to said braking means adjacent to the free ends thereof, a bar longer than the combined lengths of said links pivotally connecting said links and means connected with said bar substantially centrally thereof for engaging said braking means with said drum.

6. In a vehicle brake, a rotatable drum, braking means engageable therewith, an operating means for bodily shifting said braking means into partial engagement with said drum and then expanding the same into complete engagement therewith comprising, a pair of links pivotally connected to said braking means adjacent to the free ends thereof, the extended longitudinal axes of said links intersecting each other outside the drum when said braking means is in inoperative position, a bar longer than the combined lengths of said links pivotally connecting said links, and means connected with said bar substantially centrally thereof for engaging said braking means with said drum.

7. In a vehicle brake, a rotatable drum, braking means engageable therewith, an operating means for bodily shifting said braking means into partial engagement with said drum and then expanding the same into complete engagement therewith comprising, a pair of links pivotally connected to said braking means adjacent to the free ends thereof, a bar longer than the combined lengths of said links pivotally connecting said links, and a bell-crank lever pivotally connecting said bar for engaging said braking means with said drum.

8. In a vehicle brake, a rotatable drum, braking means engageable therewith, an operating means for bodily shifting said braking means into partial engagement with said drum and then expanding the same into complete engagement therewith comprising, a pair of links pivotally connected to said braking means a substantial distance rearwardly of the free ends thereof, a bar longer than the combined lengths of said links pivotally connecting said links, and means for moving said bar toward the axis of said drum for engaging said braking means with said drum.

Signed by me at South Bend, Indiana, this 21st day of January, 1929.

ROBERT F. KOHR.